(12) United States Patent  
Coulson et al.

(10) Patent No.: US 8,446,746 B2  
(45) Date of Patent: *May 21, 2013

(54) SWITCH MODE POWER SUPPLY CONTROLLER WITH FEEDBACK SIGNAL DECAY SENSING

(75) Inventors: David Robert Coulson, Comberton (GB); Johan Piper, Comberton (GB); David Michael Garner, London (GB)

(73) Assignee: Cambridge Semiconductor Limited (GB)

( * ) Notice: Subject to any disclaimer, the term of this patent is extended or adjusted under 35 U.S.C. 154(b) by 529 days.

This patent is subject to a terminal disclaimer.

(21) Appl. No.: 12/752,611

(22) Filed: Apr. 1, 2010

(65) Prior Publication Data

US 2010/0246216 A1 Sep. 30, 2010

Related U.S. Application Data

(63) Continuation-in-part of application No. 12/405,618, filed on Mar. 17, 2009, now Pat. No. 7,944,722, which is a continuation of application No. 11/445,473, filed on Jun. 1, 2006, now Pat. No. 7,567,445.

(30) Foreign Application Priority Data

May 23, 2006 (GB) .................................. 0610211.5

(51) Int. Cl.  
*H02M 7/537* (2006.01)

(52) U.S. Cl.  
USPC ...................... 363/97; 363/21.08; 363/21.16

(58) Field of Classification Search  
USPC ................................ 363/21.08, 21.16, 95, 97  
See application file for complete search history.

(56) References Cited

U.S. PATENT DOCUMENTS

| 4,672,516 | A | 6/1987 | Ney et al. |
|---|---|---|---|
| 5,305,192 | A | 4/1994 | Bonte et al. |
| 5,452,195 | A | 9/1995 | Lehr et al. |
| 5,748,461 | A | 5/1998 | Preller |

(Continued)

FOREIGN PATENT DOCUMENTS

| WO | WO-97/13314 A1 | 4/1997 |
|---|---|---|
| WO | WO-03/047079 A2 | 6/2003 |

(Continued)

OTHER PUBLICATIONS

"U.S. Appl. No. 12/405,618, Supplemental Notice of Allowability mailed Mar. 12, 2010", 2 pgs.

(Continued)

*Primary Examiner* — Jeffrey Sterrett  
(74) *Attorney, Agent, or Firm* — Schwegman Lundberg & Woessner, P.A.

(57) ABSTRACT

This invention relates to SMPS controllers employing primary side sensing. We describe a system for identifying a knee point in a sensing waveform, at which the output voltage of the SMPS may be sampled accurately on the primary side. The system identifies the knee point, broadly speaking, by tracking a portion of a power transformer voltage waveform, and samples the voltage waveform at the knee point to determine the SMPS output voltage. In preferred embodiments this technique is implemented using a circuit akin to a decaying peak detector, providing a timing signal indicating detection of the knee point. Sample/hold and error amplifier circuits may be employed to achieve output voltage regulation.

35 Claims, 6 Drawing Sheets

U.S. PATENT DOCUMENTS

| | | | |
|---|---|---|---|
| 5,831,839 A | 11/1998 | Pansier | |
| 5,901,052 A | 5/1999 | Strijker | |
| 5,910,887 A | 6/1999 | Kim | |
| 5,940,281 A | 8/1999 | Wolf | |
| 6,301,135 B1 | 10/2001 | Mammano et al. | |
| 6,333,624 B1 | 12/2001 | Ball et al. | |
| 6,373,726 B1 | 4/2002 | Russell | |
| 6,385,059 B1 | 5/2002 | Telefus et al. | |
| 6,396,718 B1 | 5/2002 | Ng et al. | |
| 6,590,789 B2 | 7/2003 | Bailly | |
| 6,707,283 B1 | 3/2004 | Ball | |
| 6,721,192 B1 | 4/2004 | Yang et al. | |
| 6,836,415 B1 | 12/2004 | Yang et al. | |
| 6,862,198 B2 | 3/2005 | Muegge et al. | |
| 6,882,552 B2 | 4/2005 | Telefus et al. | |
| 6,885,568 B2 | 4/2005 | Kernahan et al. | |
| 6,900,995 B2 | 5/2005 | Muegge et al. | |
| 6,956,750 B1 | 10/2005 | Eason et al. | |
| 6,958,920 B2 | 10/2005 | Mednik et al. | |
| 6,972,969 B1 | 12/2005 | Shteynberg et al. | |
| 6,977,824 B1 | 12/2005 | Yang et al. | |
| 6,985,368 B2 | 1/2006 | Park | |
| 7,016,204 B2 | 3/2006 | Yang et al. | |
| 7,027,312 B2 | 4/2006 | Park | |
| 7,248,487 B1 | 7/2007 | de Silva et al. | |
| 7,307,390 B2 | 12/2007 | Huynh et al. | |
| 7,447,049 B2 * | 11/2008 | Garner et al. | 363/21.12 |
| 7,504,815 B2 | 3/2009 | Moyse et al. | |
| 7,551,460 B2 | 6/2009 | Lalithambika et al. | |
| 7,567,445 B2 * | 7/2009 | Coulson et al. | 363/21.12 |
| 7,944,722 B2 * | 5/2011 | Coulson et al. | 363/95 |
| 2002/0015315 A1 | 2/2002 | Telefus | |
| 2005/0024898 A1 | 2/2005 | Yang et al. | |
| 2005/0073862 A1 | 4/2005 | Mednik et al. | |
| 2005/0169017 A1 | 8/2005 | Muegge et al. | |
| 2005/0276083 A1 | 12/2005 | Berghegger | |
| 2005/0285587 A1 | 12/2005 | Yang et al. | |
| 2006/0034102 A1 | 2/2006 | Yang et al. | |
| 2006/0050539 A1 | 3/2006 | Yang et al. | |
| 2006/0055433 A1 | 3/2006 | Yang et al. | |
| 2006/0056204 A1 | 3/2006 | Yang et al. | |
| 2006/0284567 A1 | 12/2006 | Huynh et al. | |
| 2007/0121349 A1 | 5/2007 | Mednik et al. | |
| 2007/0133234 A1 | 6/2007 | Huynh et al. | |
| 2007/0274106 A1 | 11/2007 | Coulson et al. | |
| 2007/0274107 A1 | 11/2007 | Garner et al. | |
| 2007/0274112 A1 | 11/2007 | Lalithambika et al. | |
| 2008/0037294 A1 | 2/2008 | de Silva et al. | |
| 2009/0073725 A1 | 3/2009 | Lin | |
| 2009/0237960 A1 | 9/2009 | Coulson et al. | |
| 2010/0039833 A1 * | 2/2010 | Coulson et al. | 363/21.05 |
| 2010/0165671 A1 * | 7/2010 | Coulson et al. | 363/21.12 |
| 2010/0246216 A1 * | 9/2010 | Coulson et al. | 363/21.12 |

FOREIGN PATENT DOCUMENTS

| | | |
|---|---|---|
| WO | WO-2004/051834 A1 | 6/2004 |
| WO | WO-2004/082119 A2 | 9/2004 |
| WO | WO-2004/112226 A1 | 12/2004 |
| WO | WO-2004/112227 A1 | 12/2004 |
| WO | WO-2004/112229 A1 | 12/2004 |
| WO | WO-2005/011095 A1 | 2/2005 |
| WO | WO-2005/048442 A1 | 5/2005 |
| WO | WO-2006/067523 A2 | 6/2006 |

OTHER PUBLICATIONS

"U.S. Appl. No. 12/405,618, Notice of Allowance mailed Dec. 7, 2009", 7 pgs.

"U.S. Appl. No. 11/445,473, Amendment and Response filed May 2, 2008 to Restriction Requirement mailed Apr. 9, 2008", 13 pgs.

"U.S. Appl. No. 11/445,473, Restriction Requirement mailed Apr. 9, 2008", 6 pgs.

"U.S. Appl. No. 11/445,473, Notice of Allowance mailed Mar. 20, 2009", 9 pgs.

"U.S. Appl. No. 11/445,473, Final Office Action mailed Dec. 30, 2008", 9 pgs.

"U.S. Appl. No. 11/445,473, Non-Final Office Action mailed Jul. 18, 2008", 8 pgs.

"U.S. Appl. No. 11/445,473, Response filed Mar. 2, 2009 to Final Office Action mailed Dec. 30, 2008", 10 pgs.

"U.S. Appl. No. 11/445,473, Response filed Oct. 20, 2008 to Non-Final Office Action mailed Jul. 18, 2008", 12 pgs.

"U.S. Appl. No. 11/445,476, Non-Final Office Action mailed Jul. 1, 2008", 14 pgs.

"U.S. Appl. No. 11/445,476, Notice of Allowance mailed Feb. 17, 2009", 10 pgs.

"U.S. Appl. No. 11/445,476, Response filed Dec. 1, 2008 to Non-Final Office Action mailed Jul. 1, 2008", 14 pgs.

"Great Britain Application Serial No. GB 0610208.1, Search Report dated Jul. 12, 2007", 1 pg.

"Great Britain Application Serial No. GB0610211.5, Search Report dated Jul. 12, 2007", 1 pg.

"International Application Serial No. PCT/GB2007/050233, International Search Report mailed Sep. 27, 2007", 2 pgs.

"International Application Serial No. PCT/GB2007/050233, Written Opinion mailed Sep. 27, 2007", 18 pgs.

Moyse, P. J., et al., "Switch Mode Power Supply Control Systems", U.S. Appl. No. 60/698,808, filed Jul. 12, 2005, 33 pgs.

Schrufer, E., *Elektrische Mebtechnik: Messung elektrischer und nichtelektrischer GroBen*, Carl Hanser Verlag, Munchen, (1983), 299-300.

* cited by examiner

SWITCH MODE POWER SUPPLY CONTROLLER WITH FEEDBACK SIGNAL DECAY SENSING

CROSS-REFERENCE TO RELATED APPLICATIONS

This application is a continuation-in-part of U.S. patent application Ser. No. 12/405,618, filed Mar. 17, 2009 now U.S. Pat. No. 7,944,722, which is a continuation of U.S. patent application Ser. No. 11/445,473 filed Jun. 1, 2006 corresponding to issued U.S. Pat. No. 7,567,445 B2, issued Jul. 28, 2009, which claims priority under 35 U.S.C. 119 from United Kingdom Application No. 0610211.5 filed 23 May 2006, which applications and patents are incorporated herein by reference in their entirety.

FIELD OF THE INVENTION

This invention generally relates to a switch mode power supply (SMPS) controllers and to related methods. More particularly it relates to SMPS controllers employing primary side sensing to detect in a sensing waveform, at which point the output voltage of the SMPS may be sampled on the primary side.

BACKGROUND TO THE INVENTION

Broadly speaking in a switch mode power supply a magnetic energy storage device such as a transformer or inductor is used to transfer power from an input side to an output side of the SMPS. A power switch switches power to the primary side of the energy storage device, during which period the current and magnetic field builds up linearly. When the switch is opened the magnetic field (and secondary side current) decreases substantially linearly (on average) as power is drawn by the load on the output side.

An SMPS may operate in either a discontinuous conduction mode (DCM) or in continuous conduction mode (CCM) or at the boundary of the two in a critical conduction mode. In DCM operating modes in which, when the switching device is turned off, the output voltage steadily, but gradually, declines until a point is reached on the knee of the output curve at which substantially zero output current flows and the inductor or transformer begins to ring, entering a so-called oscillatory phase. The period of the ringing is determined by the inductance and parasitic capacitance of the circuit. In this specification DCM includes so-called critical (discontinuous conduction) mode (CRM) operation in which the power switch is turned on again at the first trough of the oscillatory phase (sometimes referred to as the flyback oscillation). Operation in CRM can be particularly efficient by reducing losses associated with the power switch turn-off transition. In continuous conduction mode (CCM) the power switch is turned on to "recharge" the flux in the inductor or transformer for a subsequent cycle before the flux, and hence output current, has fallen to zero (so that the inductor or transformer is substantially always "on"). Embodiments of the techniques we describe are useful for all these three modes of operation.

Often the output voltage of an SMPS is regulated by sensing circuitry on the output side, coupled back to the input side of the SMPS by means of an opto-isolator. However some improved techniques employ primary side sensing or, more generally, sensing employing an auxiliary winding on the magnetic energy storage device, or in some related circuits an auxiliary winding of an output filter inductor.

Some background prior art relating to primary side sensing can be found in U.S. Pat. Nos. 6,958,920; 6,721,192; US2002/015315; WO2005/048442; WO2004/051834; US2005/0024898; US2005/0169017; U.S. Pat. Nos. 6,956,750; 6,862,198; US2006/0056204; U.S. Pat. No. 7,016,204; US2006/0050539; US2006/0055433; US2006/0034102; U.S. Pat. Nos. 6,900,995; 6,862,198; and U.S. Pat. No. 6,836,415. Still further background prior art can be found in U.S. Pat. No. 6,385,059, US20050276083, U.S. Pat. Nos. 6,977,824, 6,956,750, WO2004082119, U.S. Pat. No. 6,972,969, WO03047079, U.S. Pat. No. 6,882,552, WO2004112227, US2005285587, WO2004112226, WO2005011095, U.S. Pat. Nos. 6,985,368, 7,027,312, 6,373,726, 4,672,516, 6,301,135, 6,707,283, and U.S. Pat. No. 6,333,624. We further refer to US 2009/0073725 A1 (application U.S. Ser. No. 12/232,325, published Mar. 19, 2009, Lin) and U.S. Pat. No. 5,305,192 (application U.S. Pat. No. 786,718, date of patent Apr. 19, 1994, Bonte and Nelson, assignee Linear Technology Corporation), U.S. Pat. No. 7,307,390, US2007/0133234, and U.S. Pat. No. 6,590,789.

Referring now to FIG. 1, this shows an example of a switch mode power supply circuit with primary side sensing. The power supply comprises an AC mains input coupled to a bridge rectifier 14 to provide a DC supply to the input side of the power supply. This DC supply is switched across a primary winding 16 of a transformer 18 by means of a power switch 20, in this example an insulated gate bipolar transistor (IGBT). A secondary winding 22 of transformer 18 provides an AC output voltage which is rectified to provide a DC output 24, and an auxiliary winding 26 provides a feedback signal voltage proportional to the voltage on secondary winding 22. This feedback signal provides an input to a control system 28, powered by the rectified mains. The secondary winding is usually physically isolated from the primary winding (and auxiliary winding, if present) and their associated components to meet legislative requirements. The control system provides a drive output 30 to the power switching device 20, modulating pulse width and/or pulse frequency to regulate the transfer of power through transformer 18, and hence the voltage of DC output 24. In embodiments the power switch 20 and controller 28 may be combined on a single power integrated circuit.

As can be seen, the primary side controlled SMPS of FIG. 1 derives feedback information from the primary side of the transformer, using an auxiliary winding to avoid high voltage signals, the voltage being stepped down by the turns ratio of the transformer. As the skilled person will appreciate, however, it is not necessary to employ a separate auxiliary winding although this may be convenient if such a winding is already contemplated to provide a low voltage supply to the controller. For example, a voltage of the primary winding may be sensed, preferably capacitor coupled so that it can be referenced to the ground of the controller, and stepped down using a potential divider. An example circuit for this is shown inset in FIG. 1, with a dashed connection to the primary winding 16. The skilled person will further appreciate that an auxiliary winding is not necessary to provide a dc supply for the controller as this may be derived from the high voltage dc supply on the primary side of the SMPS or in a number of other ways, for example using a capacitor charge pump driven via a diode from the switched voltage on the power switch. In some preferred implementations, therefore, the auxiliary winding is omitted.

We will describe techniques for using the transformer voltage waveform to generate feedback information for regulating an SMPS. These facilitate operation across a wide range of input and output conditions and, in embodiments, provide lower cost, inaudible operation and improved output regulation.

SUMMARY OF THE INVENTION

According to a first aspect of the invention there is therefore provided a system for sensing an output voltage of a switch mode power supply (SMPS), the SMPS including a switched magnetic energy storage device for conveying power from an input to an output of said SMPS, said magnetic device having at least one winding, the system comprising; an input to receive a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output; a signal follower coupled to said input to generate a decay signal approximating said decaying portion of said sensing signal waveform; a comparator to compare said decay signal with said sensing signal waveform to identify when said sensing signal waveform decays faster than said decay signal; and a sampler to sample said sensing signal responsive to said comparator to provide an output signal sensing said output voltage of said SMPS.

The above described sensing system may be employed in an SMPS controller operating in either DCM/CRM mode or in CCM mode. In DCM/CRM mode the second portion of the feedback signal waveform comprises an oscillatory portion of the waveform (although not necessarily with a complete cycle of oscillation); in CCM mode the second portion of the waveform comprises a portion of the waveform during which input power is switched to the magnetic energy storage device.

In DCM/CRM embodiments the system may be employed to detect a point of substantially zero magnetic flux by detecting a knee in this sensing waveform between the decaying and oscillatory portions of the waveform. At this point the output voltage of the SMPS may be sampled accurately on the primary side since, because the secondary side current is substantially zero, there is substantially no voltage drop across the secondary side components, typically a diode and some series resistance.

In CCM embodiments the system can be used to determine when a power switching device switching input power to the magnetic energy storage device turns on. Typically such a power switching device comprises a bipolar or MOSFET switch which often has a small switching delay. By monitoring the sensing signal waveform the actual switching time of such a device can be established. Furthermore, it is desirable for a CCM mode SMPS controller to be able to control an SMPS in a DCM mode so that this mode can be employed at low load levels. Embodiments of the above described sensing system can be used in both DCM and CCM modes and thus a single, common sensing system can be used for an SMPS controller rather than having to switch between different sensing systems depending upon the operating mode of the SMPS. Embodiments of the sensing system provide such dual mode operation (triple mode, if CRM is considered as a separate mode).

Depending upon the SMPS implementation, for example where in DCM mode the oscillatory portion of the signal includes more than one cycle of oscillation, there may be more than one point when the sensing signal waveform decays faster than the decay signal. Preferably, therefore, the system also includes an enable input to receive an enable signal for disabling the operation of the sampler during the oscillatory portion of the sensing signal. The enable signal may disable the signal follower and/or comparator and/or may gate the comparator output; it may be derived from the sensing signal waveform or, for example, from a drive signal driving a power switching device of the SMPS.

In some preferred embodiments the signal follower comprises a decaying peak detector, to detect peaks of the sensing signal and to hold these with a decaying characteristic. In one embodiment the decaying peak detector comprises a rectifier coupled to capacitor, with a discharge circuit, such as a current generator, coupled across the capacitor. The comparator may have an offset built in to offset a voltage drop across the rectifier.

The sampler to sample the sensing signal responsive to the comparator may comprise a sample-hold circuit to sample and hold the sensing signal when the sensing signal waveform decays faster than the decay signal. The sensing signal may be sensed either directly or indirectly, for example by sensing the decay (the output of the decaying peak detector) which, until the sampling point, tracks the sensing signal. In other embodiments the sampler comprises an integrator to sample the sensing signal by integrating the sensing signal waveform from the point when the sensing signal waveform decays faster than the decay signal, to a later point on the sensing signal waveform, for example a zero-crossing of the sensing signal waveform. This integration gives a value which is dependent upon the amplitude of the signal at the knee point on the sensing signal waveform, and hence can be used to provide a control signal for controlling the SMPS. Further details of such an "area correlation" method are described in the assignee's co-pending patent application Ser. No. 11/445, 476, filed on Jun. 1, 2006, issued as U.S. Pat. No. 7,551,460 on Jun. 23, 2009, inventor Vinod A Lalithambika, et al, which is hereby incorporated by reference in its entirety.

The invention further provides an SMPS controller including a sensing system as described above and, in preferred embodiments, a comparator to compare the output signal with a reference and to provide a control output for controlling a switch mode power supply in response to the comparison. The comparator, in embodiments, may comprise an error amplifier to provide an analogue error signal (albeit in embodiments this may be represented in a digital form, though with multiple rather than just two binary levels). Use of an analogue control signal facilitates stabilising the control loop of the SMPS.

In another aspect the invention provides an SMPS controller for controlling the output of an SMPS, the SMPS including a switched magnetic energy storage device for conveying power from an input to an output of said SMPS, said magnetic device having at least one winding, the controller comprising: a sense input to receive a sense signal waveform from said magnetic device; a decaying peak detector coupled to said sense input to detect when said sense signal waveform has a falling slope of greater than a threshold value and to generate a first timing signal: an output to provide an SMPS control signal responsive to a value of said sense signal waveform at a time indicated by said first timing signal.

In embodiments the SMPS control signal is used to regulate an output voltage of the SMPS, for example by controlling a pulse width and/or frequency of an oscillator driving a power switch switching power to the magnetic energy storage device. In some preferred embodiments the controller includes a timing signal input so that the SMPS control signal output does not detect large negative slopes at peaks in a resonant, oscillatory portion of the sense signal waveform. Preferably the controller includes a sample-hold module to sample and hold the sense signal waveform in response to the first timing signal. In implementations of the controller in an SMPS there may be multiple subsidiary peaks in the generally linearly decaying portion of the sense signal waveform and, therefore, the sample-hold module may, in embodiments, sample peaks of this superimposed "noise", holding the last sample before the second timing signal indicates that substantially no power is being supplied by the SMPS, that is the last sample before the sampling is disabled by the second timing signal. In other embodiments an integration-based or "area correlation" sampling technique may be employed.

In a related method the invention provides a method of sensing an output voltage of a switch mode power supply (SMPS), the SMPS including a switched magnetic energy storage device for conveying power from an input to an output of said SMPS, said magnetic device having at least one winding, the method comprising: inputting a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output; identifying a knee point said sensing signal waveform between said decaying portion and said second portion of said waveform; and using a value of said sensing signal at said knee point to sense said SMPS output voltage; and wherein said identifying of said knee point comprises fitting an approximate tangent to said decaying portion of said sensing signal waveform; and identifying departure of said sensing signal waveform from said approximate tangent to identify said knee point.

In embodiments the knee point on the sensing signal waveform corresponds to a point at which the secondary current has just dropped to substantially zero (at which point the voltage across a secondary winding may substantially equal an output voltage of the SMPS). It will be appreciated that the sensing signal will in general provide a signal which is proportional to the SMPS output voltage, for example as determined by a primary: secondary or auxiliary: secondary turns ratio of a transformer of the SMPS, rather than voltage which is exactly equal to the SMPS output voltage.

Some embodiments of the method may directly determine when the sensing signal waveform departs from the approximate tangent, by more than a threshold different in slope, to identify the knee point. However in some preferred embodiments when the method is operating (enabled) each departure of the sensing signal waveform, by greater than a threshold level, from the approximate tangent is detected and used trigger a sample (and hold) of the sensing signal (or a signal derived therefrom) until the second portion of the sensing signal waveform is reached, at which point the last detected departure, which was sampled (and held) provides a value of the sensing signal (or a signal derived therefrom) at the knee point. Alternatively an area integration method as indicated above may be employed, using the value of the sensing signal at the knee point by integrating the sensing signal waveform from the knee point to a later point to (indirectly) sense the SMPS output voltage.

In a further aspect the invention provides a method of sensing an output voltage of a switch mode power supply (SMPS), the SMPS including a switched magnetic energy storage device for conveying power from an input to an output of said SMPS, said magnetic device having at least one winding, the method comprising: inputting a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output; identifying a knee point on said sensing signal waveform between said decaying portion and said second portion of said waveform; and using a value of said sensing signal at said knee point to sense said SMPS output voltage; and wherein said identifying of said knee point comprises detecting a point of greater than a threshold negative slope in said sensing signal waveform.

There is also provided a method of regulating the output voltage of an SMPS using an output voltage sensing method as described above. The regulating may, in embodiments, comprise comparing the sensed output voltage with a reference level to provide an error signal substantially proportional to the difference between the two, and using the error signal to control the SMPS.

In a still further aspect the invention provides a system for sensing an output voltage of an SMPS, the SMPS including a switched magnetic energy storage device for conveying power from an input to an output of said SMPS, said magnetic device having at least one winding, the system comprising: means for inputting a sensing signal from said at least one winding of said magnetic device, said sensing signal having a waveform with a first, decaying portion during which power is supplied by said magnetic device to said SMPS output and a second portion during which substantially no power; means for identifying a knee point on said sensing signal waveform between said decaying portion and said second portion of said waveform; and means for using a value of said sensing signal at said knee point to sense said SMPS output voltage; and wherein said means for said identifying of said knee point comprises: means for fitting an approximate tangent to said decaying portion of said sensing signal waveform; and means for identifying departure of said sensing signal waveform from said approximate tangent to identify said knee point.

The invention still further provides a system for sensing an output voltage of an SMPS, the SMPS including a switched magnetic energy storage device for conveying power from an input to an output of said SMPS, said magnetic device having at least one winding, the system comprising: means for inputting a sensing signal from said at least one winding of said magnetic device, said sensing signal having a waveform with a first, decaying portion during which power is supplied by said magnetic device to said SMPS output and a second portion during which substantially no power is transferred; means for identifying a knee point on said sensing signal waveform between said decaying portion and said second portion of said waveform; and means for using a value of said sensing signal at said knee point to sense said SMPS output voltage; and wherein said means for said identifying of said knee point comprises: means for detecting a point of greater than a threshold negative slope in said sensing signal waveform.

In a further aspect the invention provides a system for sensing an output voltage of a switch mode power supply (SMPS), the SMPS including a switched magnetic energy storage device for conveying power from an input to an output of said SMPS, said magnetic device having at least one winding, the system comprising; an input to receive a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output; a signal follower coupled to said input to generate a decay signal approximating said decaying portion of said sensing signal waveform; a comparator to compare said decay signal with said sensing signal waveform to identify substantially a knee point on said sensing signal waveform when said sensing signal waveform decays faster than said decay signal; and a sampler to sample said sensing signal responsive to said comparator to provide an output signal sensing said output voltage of said SMPS, wherein said coupling of said signal follower to said input is such that decay of said decay signal is dependent on said sensing signal waveform.

In embodiments of this approach the comparator is arranged to detect a point where the sensing signal waveform and the decay signal cross to identify substantially the knee point on the sensing signal waveform, in particular a last said crossing point prior to the sensing signal waveform falling towards a zero voltage level. In embodiments the comparator detects a point when a negative slope in the sensing signal waveform is greater than a threshold negative slope. In embodiments at the crossing point the rate of change of the sensing signal waveform is substantially the same as the rate of change of the decay signal. (In FIG. 10 described later, which illustrates the crossing point, the scale is hugely magnified thus magnifying slight differences between the timing/slope of the sensing and decay signals). In embodiments the threshold negative slope is set by one or more trimmable components, for example a trimmable resistor.

In embodiments the signal follower may comprise a substantially constant current generator, in embodiments a current sink; optionally the constant current set by this substantially constant current generator may be adjusted or trimmed. In embodiments the substantially constant current generator comprises a resistor of suitably high value, in some implementations several megaohms.

In a still further aspect the invention provides a system for sensing an output voltage of a switch mode power supply (SMPS), the SMPS including a switched magnetic energy storage device for conveying power from an input to an output of said SMPS, said magnetic device having at least one winding, the system comprising; an input to receive a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output; a signal following circuit component having a first connection coupled to said input, and having a second connection; a comparator having first and second inputs respectively coupled to said first and second connections of said signal following circuit component to identify substantially a knee point on said sensing signal waveform; a decay circuit coupled to said second connection of said signal following circuit component; and a sampler to sample said sensing signal responsive to an output of said comparator to provide an output signal sensing said output voltage of said SMPS.

As described in more detail later, in one implementation a diode is coupled across the comparator inputs (preferably with a voltage source to compensate for a voltage drop across the diode), and the decay circuit comprises a capacitor with a current sink connected in parallel across the capacitor to decay the voltage on the capacitor.

In other embodiments, however, the signal following circuit component comprises a passive circuit component, more particularly a resistor. With this latter arrangement in a steady state the voltage on the decay circuit is substantially that at the input (derived from an auxiliary winding) less a voltage drop across this resistor. However as the input voltage falls the decay signal is maintained by the capacitor in the decay circuit and there comes a point where the voltage on the decay circuit and the voltage at the input (from the auxiliary winding) are substantially the same. At this point there is substantially no current flowing through the resistor across the input connections of the comparator. This is the point at which an idealised comparator switches. (Since at this point there is no current through the resistor across the input terminals of the comparator, at this point the rate of fall of the decay signal is proportional to the rate at which charge flows off the capacitor, which is set by the constant current generator/resistor).

In one embodiment of the foregoing arrangement a switch is provided in series with the input, controlled by an output of the comparator. Once the knee point is detected this switch is opened. Then the voltage on the decay circuit decreases substantially linearly, set by the rate of flow of current off the capacitor (or is held constant if the constant current generator/resistor is omitted, effectively setting the decay current at zero). In such an arrangement the switch on the input may be closed later in readiness for a further knee detection.

In another, preferred, approach however, a switch of the type previously described is omitted and the input is connected to a signal following, for example, the voltage on an auxiliary winding of the magnetic device (transformer). For example an auxiliary winding may be coupled to the input of the sensing circuit via a potential divider. Such an arrangement has some advantages in that the decay signal may be dragged down by the sensing signal (auxiliary winding voltage), which allows the circuit to respond better to the sharp initial transients that can be present when the primary side switch first opens (in effect the potential divider and auxiliary winding behaving as a low pass filter). Another advantage of this latter approach in which a switch in series with the input is omitted, is that the timing of the knee point may be more accurately identified.

As previously mentioned, in embodiments the decay circuit comprises a capacitor in parallel with a constant current generator, for example a high value resistor. In such a case the decay rate is effectively set by the RC time constant of this circuit and thus to accurately define a threshold rate of change of the decay signal (to achieve accurate voltage regulation) it is helpful if one or both of the R and C values can be varied, for example by means of an on chip trimming process. In embodiments this may be implemented digitally by means of a programmable or memorised setting or connection. Since the output voltage is regulated a high value resistor is a good approximation to a constant current generator but it is believed that a slight variation of current with voltage which is still present operates so as to increase the accuracy of the knee point identification.

In a still further related aspect there is provided a method of sensing an output voltage of a switch mode power supply (SMPS), the SMPS including a switched magnetic energy storage device for conveying power from an input to an output of said SMPS, said magnetic device having at least one winding, the method comprising: inputting on an input line a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output; identifying substantially a knee point on said sensing signal waveform between said decaying portion and said second portion of said waveform; and using a value of said sensing signal at said substantial knee point to sense said SMPS output voltage; and wherein said identifying of said substantial knee point comprises generating on a decay signal line a decay signal approximating said decaying portion of said sensing signal waveform; and identifying crossing of said sensing signal waveform and said decay signal to identify said substantial knee point, wherein said generating generates said decay signal such that decay of said decay signal is dependent on said decaying portion of sensing signal waveform.

The skilled person will appreciate that the above-described techniques may be employed in a wide variety of SMPS architectures including, but not limited to, a flyback converter and a direct-coupled boost converter. In some implementations the magnetic energy storage device comprises a transformer with primary, secondary, and auxiliary windings but in other implementations an auxiliary winding may be provided on another inductor of the SMPS. In still other implementations an auxiliary winding may be omitted and the sensing signal derived from a primary winding, for example as described above with reference to FIG. 1.

In a further related aspect the invention provides a switch mode power supply including an SMPS controller as described above.

In some preferred embodiments a system or SMPS controller as described above is implemented mainly or entirely using analogue circuitry. This is because clocked digital systems can introduce higher costs, audible noise problems and output inaccuracies due to the time-quantisation effects of the digital sampling process.

In other embodiments, however, the system or SMPS controller may be implemented partially or wholly using digital circuitry. Thus the invention further provides a carrier medium carrying processor control code such as RTL or SystemC defining hardware to implements such circuitry.

BRIEF DESCRIPTION OF THE DRAWINGS

These and other aspects of the invention will now be further described, by way of example only, with reference to the accompanying figures in which.

DETAILED DESCRIPTION

Figure 1:
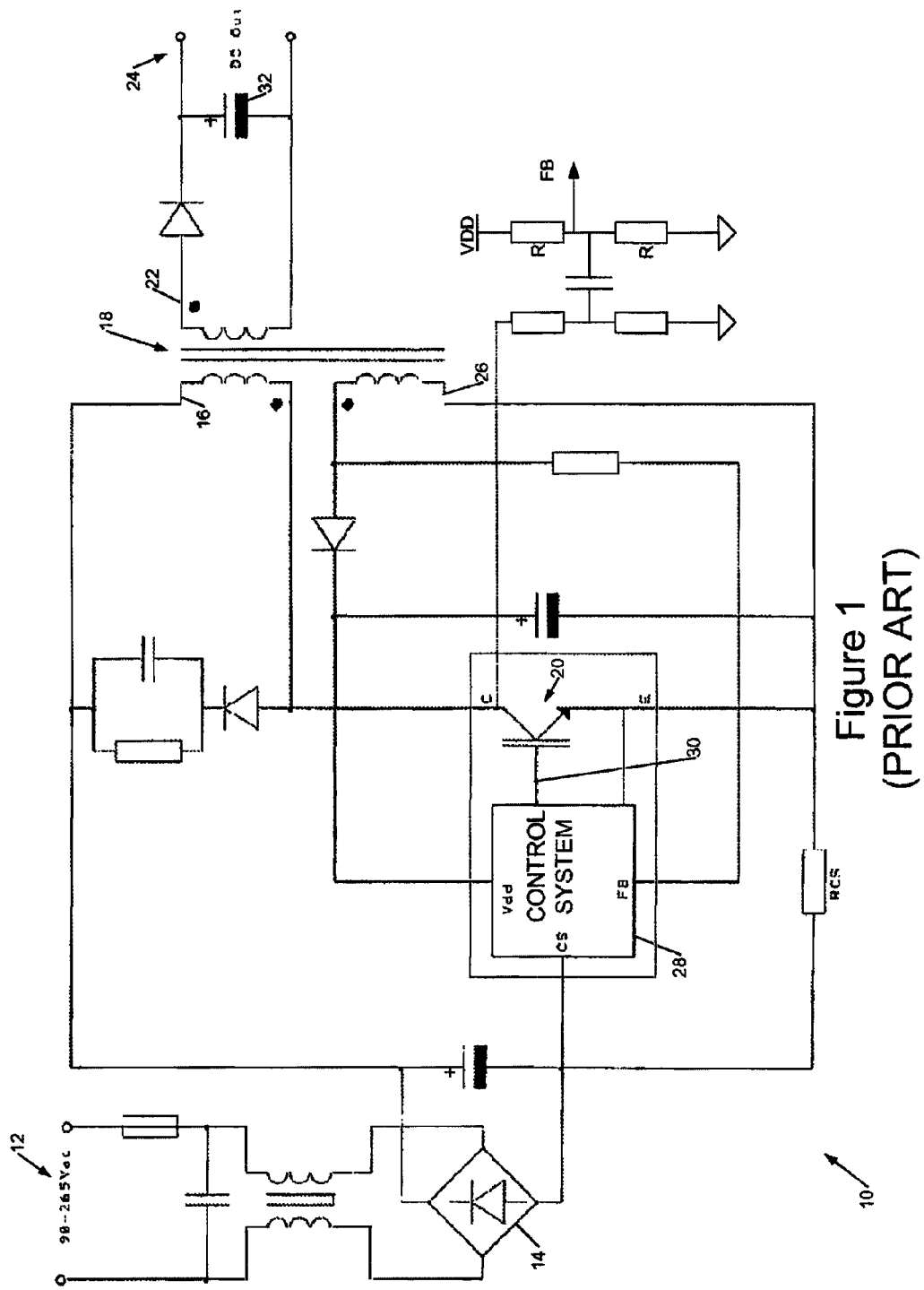
FIG. 1 shows an example of an SMPS incorporating primary side sensing.

Broadly speaking we will describe an apparatus and a related method for measuring an output voltage from a primary side of a power converter. A winding on the power transformer, such as a primary or auxiliary winding, provides a waveform to a peak detector with defined decay characteristic. The peak detector voltage thus forms a tangent to a selected portion of the auxiliary winding waveform. A status signal from the peak detector indicates the time(s) when the tangent coincides with (and departs from) the auxiliary winding waveform, thus in DCM/CRM providing an estimated instant when the transformer secondary winding current has dropped to zero. The status signal controls a sample/hold circuit, which at that instant captures a voltage reflecting a secondary voltage of the transformer, such as a voltage from the primary or an auxiliary winding of the transformer. In CCM essentially the same technique may be employed to determine when the (primary side) power switching device has turned on.

In embodiments an error amplifier compares the captured voltage against a reference to determine an error signal, preferably an analogue error signal, which may be used to regulate the power converter output voltage. The use of an analogue error signal allows the loop gain to be predicted accurately, facilitating loop compensation. Further analogue embodiments of the technique facilitate implementation of a controller with a low power consumption.

One difficulty in primary-side sensing, in particular when operating in DCM/CRM modes, is deciding exactly when to sample the reflected secondary voltage. Ideally this voltage should be sampled at the point at which the current in the secondary winding just falls to zero, as it is at this point that the sampled voltage most accurately represents the output voltage. This is because when the secondary current has just dropped to zero, there is no voltage drop across the secondary rectifier diode or its and the transformer's series resistance, and thus the voltage across the secondary winding is equal to the output voltage. The voltage across, say, the auxiliary winding is equal to the voltage across the secondary winding multiplied by the (known) turns ratio between the two windings, and the secondary voltage can thus be inferred by measuring the voltage across (say) the auxiliary winding at this point.

In CCM mode the secondary voltage can be sensed via a primary or auxiliary winding in a similar way to DCM mode except that the secondary voltage is sampled at a non-zero secondary side current. This non-zero (although sometimes small) current introduces a non-zero voltage drop across the secondary side components, which may comprise for example a diode and some output resistance. Thus preferably in CCM mode some compensation is made for the voltage drop from the secondary side winding to the SMPS output across these components. This compensation can be made, for example, based upon an approximate knowledge of the secondary side current, which can be inferred from the current in the primary side switch.

Figure 2:
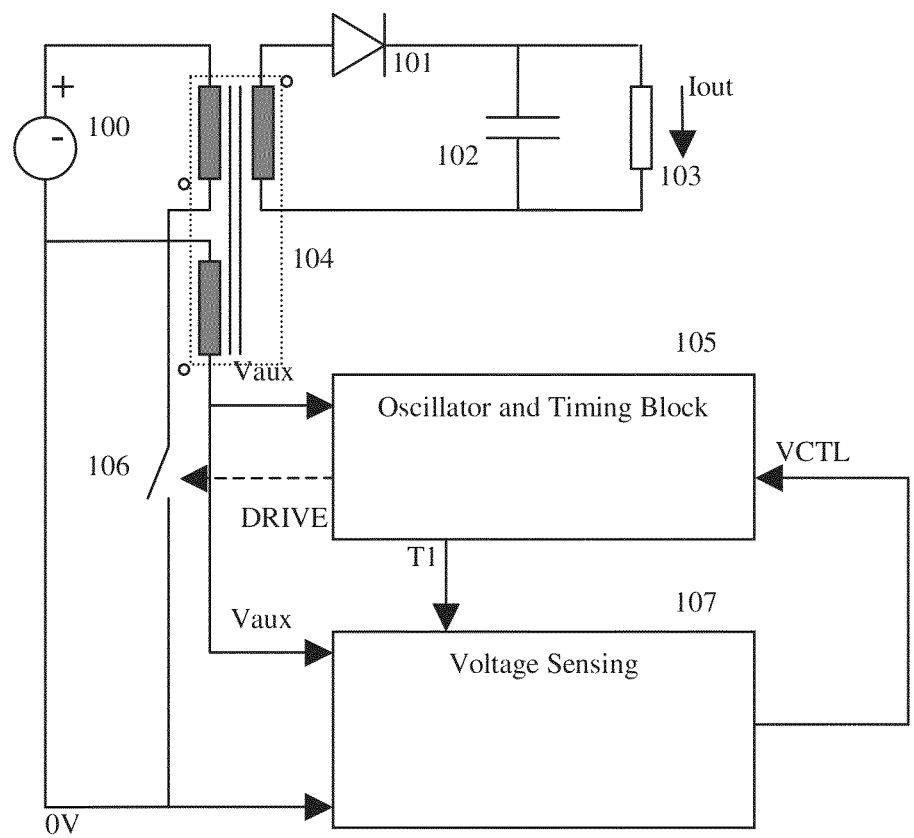
FIG. 2 shows a switch mode power supply (SMPS) including an SMPS controller according to an embodiment of the invention.

Referring now to FIG. 2, this shows a block diagram of a flyback single-switch SMPS 200 incorporating an embodiment of an SMPS controller according to the invention. As illustrated the controller is operating in the context of a flyback SMPS converter, but the skilled person will understand that the techniques we describe are also applicable to other forms of SMPS converters.

A DC source 100 is connected to the primary winding of a transformer in series with a primary side switch 106. The secondary winding of the transformer is connected to an output diode 101 in series with a capacitor 102. A load, represented by a resistor 103 is connected across the output capacitor 102. One end of an auxiliary winding on the transformer 104 is connected between the negative terminal of the DC supply 100 and the other end "VAUX" is connected to an Oscillator and Timing Block 105 and to a Voltage Sense Block 107.

The Voltage Sense Block 107 generates a signal (or value) VCTL representing the required level of output power, from signals VAUX and T1. The VCTL signal is fed back to the Oscillator and Timing Block which generates a DRIVE pulse for switch 106 at an appropriate frequency and duration.

In embodiments the timing signal T1 is derived from the VAUX signal, providing the timing control for the Voltage Sense Block 107. Typically T1 is driven active shortly after VAUX goes positive (allowing time for the initial overshoot waveform artefacts to decay), for example based on a comparison of VAUX with zero or on the DRIVE signal. T1 may be driven inactive when VAUX goes negative again. For example, a comparator may be employed to identify a negative-going zero-crossing of VAUX to drive T1 inactive. Timing signal T1 may be generated either by oscillator block 105 or within voltage sensing block 107.

As previously mentioned, the Oscillator and Timing Block 105 uses the input VCTL to control the frequency and pulse duration applied to the DRIVE output, which controls the main primary switch 106. As the skilled person will understand, the Oscillator and Timing Block 105 may be implemented in many different ways; examples of some particularly advantageous techniques are described in the Applicant's patent applications U.S. 60/698,808 (0513772.4) and PCT/GB2005/050244, hereby incorporated by reference.

Figure 7:
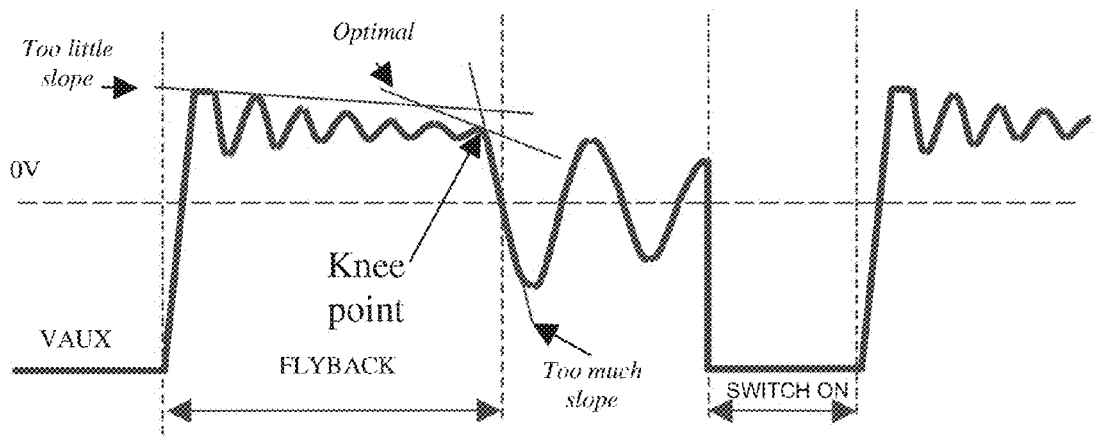
FIG. 7 shows waveforms illustrating the principle of operation of an SMPS controller according to an embodiment of the invention.

Before describing details of the voltage sensing module 107 we first refer to FIG. 7 to describe the tangent-based method of output voltage sensing. The aim of the tangent method of output voltage sensing is to accurately detect the voltage in the transformer auxiliary winding at the knee point, that is the point at which the transformer secondary current drops to substantially zero, as shown in FIG. 7.

The VAUX (sensing) signal from the primary or auxiliary winding of the power transformer typically appears as shown. This is a transform of the secondary winding, generally with superimposed artefacts generated by winding leakage inductance, stray capacitance, and the like. Broadly, the tangent method works by fitting a tangent with a negative slope to the flyback portion of the VAUX waveform. The tangent slope is chosen to optimise the accuracy of identifying the knee point and to ensure that the waveform artefacts have minimal influence. The VAUX signal is then sampled at the knee point and compared to a voltage reference to determine the output error voltage. A preferred practical implementation, as described below.

Figure 3:
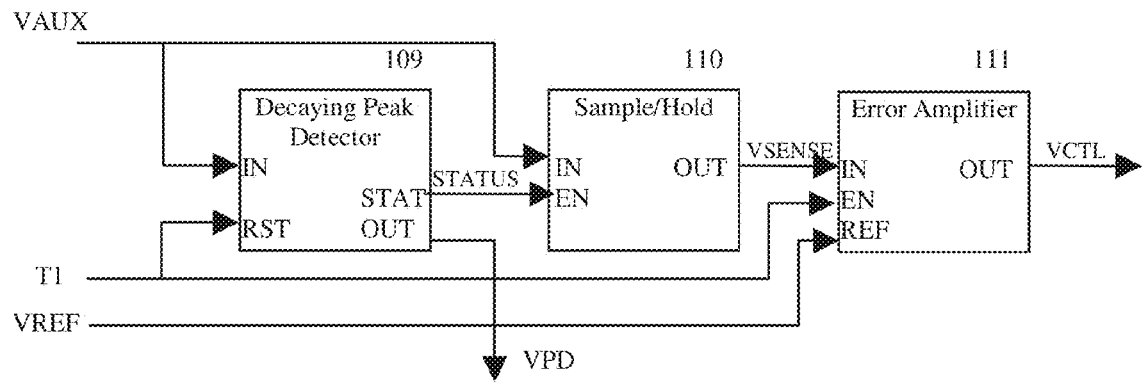
FIG. 3 shows details of the voltage sensing block of the controller of FIG. 2.
Figure 8:
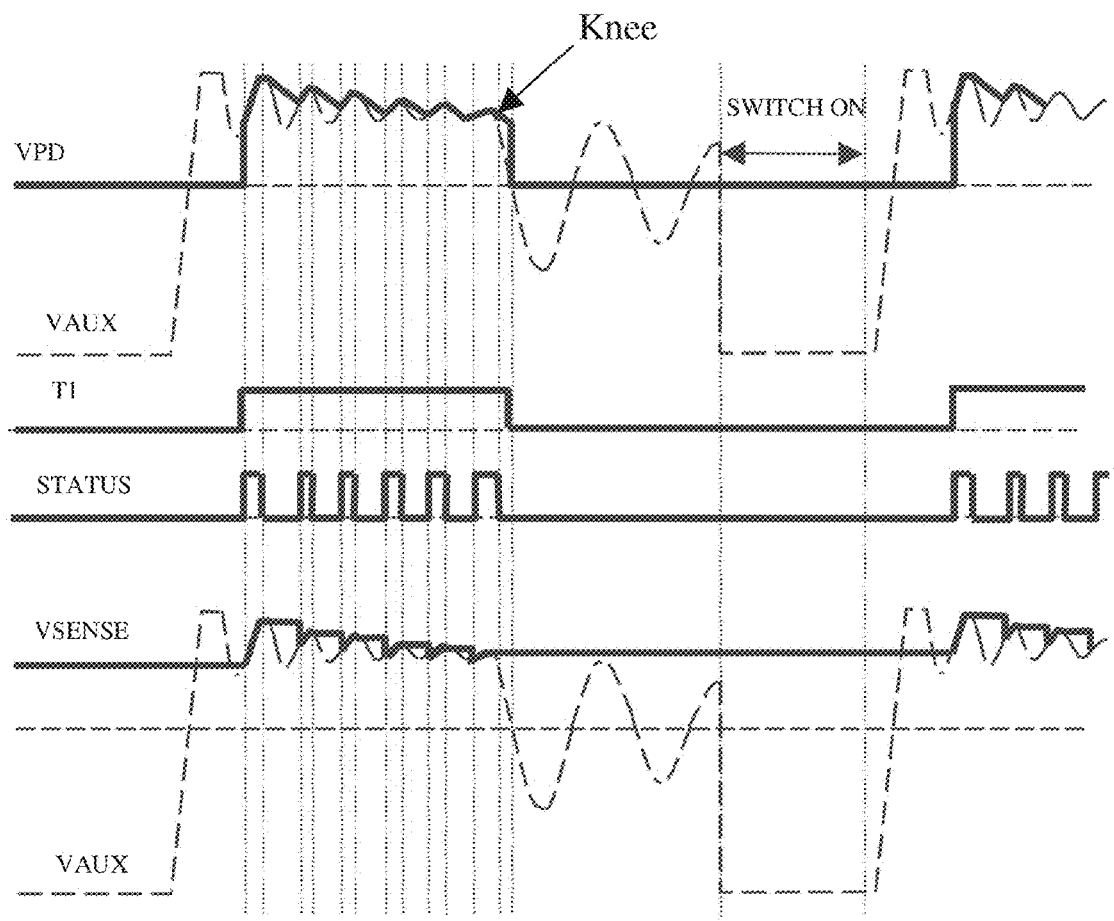
FIG. 8 shows example waveforms illustrating the operation of the SMPS controller of FIG. 3.

Referring now to FIG. 3, this shows the main functional blocks of the Voltage Sensing circuit 107, which together comprise a decaying peak detector block 109, a sample/hold block 110 and an error amplifier block 111, generating the output signal VCTL (output voltage control). Typical waveforms are shown in FIG. 8. The output VPD (voltage peak detect) from the decaying peak detector block 109 is not used in some embodiments; in others it may be used to sense or sample a value of VAUX since it approximately tracks VAUX during its approximately linearly decaying portion and is substantially equal to VAUX at the knee point.

Figure 4:
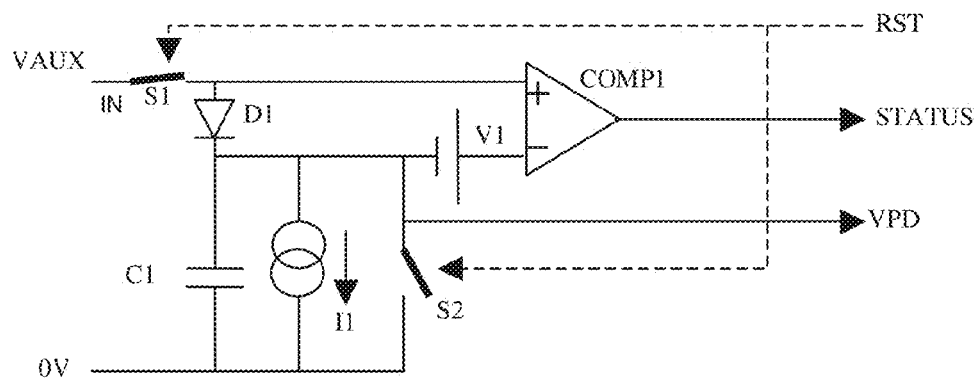
FIG. 4 shows an example decaying peak detector for the voltage sensing block of FIG. 3.

FIG. 4 shows an implementation of the decaying peak detector (DPD) block 109 of FIG. 3.

Referring to FIG. 4, the VAUX is fed into the input (IN) of the DPD block as shown. When timing signal T1 is inactive (low in FIG. 8) the DPD is reset, forcing the output voltage VPD to 0 volts. As shown, T1 is active, and therefore switch S1 is closed and switch S2 is open so that the DPD is not reset. When T1 is active, the circuit works as a peak detector, providing output VPD which decays at a predetermined rate. Alternatively the peak detector may be free-running, in which case the EN signal may be gated by T1. As shown in FIG. 8, VPD follows the VAUX waveform except when the slope of VAUX exceeds a certain (negative) value, at which point the VAUX and VPD waveforms separate from one another. The STATUS signal from the DPD is active when the DPD is updating (increasing) the VPD signal.

An example implementation for the decaying peak detector 109, shown as a behavioural model, is illustrated in FIG. 4. A diode D1 and a capacitor C1 together comprise a peak detector; this is enabled when switch S1 is closed and S2 is open. A current sink I1 discharges the voltage on C1, thus defining the slope of the tangent. A comparator COMP1 compares the tangent approximating voltage on C1 with the VAUX input. Preferably a voltage source V1 adds a small DC offset compensating for the forward voltage drop of D1. Thus comparator COMP1 will issue a STATUS active if VAUX is greater than or equal to the (decaying) voltage on C1. Thus the DPD effectively detects when VAUX has greater than a threshold downwards or negative slope. The peak detector is re-initialised by the RST signal, closing switch S2 and opening switch S1, thereby discharging the voltage on capacitor C1. The rate of discharge of C1 is set by I1, which is chosen according to the implementation so that, in embodiments, the voltage on C1 follows the approximately linear descent of VAUX, that is so that it follows an approximate tangent to VAUX prior to its oscillatory or resonant portion.

Figure 5:
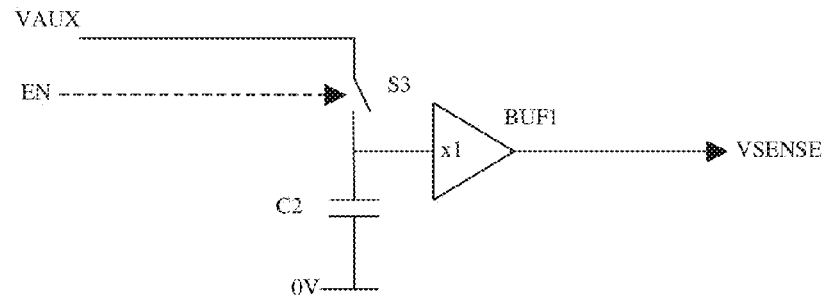
FIG. 5 shows an example sample/hold module for the voltage sensing block of FIG. 3.

An example implementation for the sample/hold module 110 is illustrated in FIG. 5. Buffer BUF1, capacitor C2 and switch S3 together comprise a sample/hold circuit, which samples the VAUX input when EN is active and holds the sampled value when EN is inactive. Thus, the voltage output VSENSE holds the instantaneous value of VAUX when STATUS is driven inactive (at various points in the flyback phase and finally at the knee point), as shown in FIG. 8.

Figure 6:
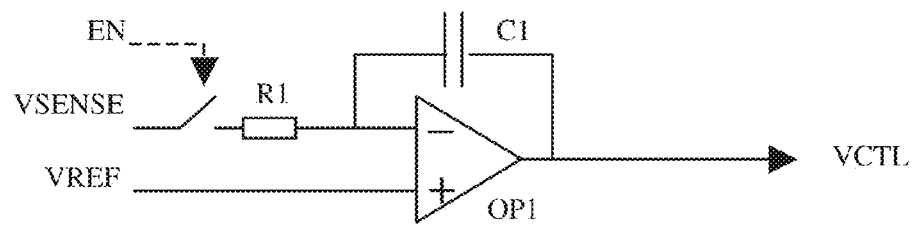
FIG. 6 shows an example error amplifier for the voltage sensing block of FIG. 3.

An example implementation for the error amplifier module 111 is illustrated in FIG. 6. Amplifier OP1, capacitor C1 and resistor R1 form a simple integrator, enabled by switch S4. While input EN is active, switch S4 is closed, enabling the amplifier OP1 to integrate the difference between VSENSE and VREF. The time constant is preferably at least several cycles of oscillator 105, for example around 10 cycles. In this way the accumulated error over many switching cycles may be used by the Oscillator and Timing Block to modify the delivered power and thereby regulate the output voltage. Those skilled in the art will appreciate that the resistor and capacitor shown may be replaced by a variety of different impedance networks, for example in order to compensate the control loop using, say, pole-cancellation techniques.

Referring back once more to FIG. 7, it will be appreciated that it is desirable that the waveform to which the tangent-detection technique we have described is applied is relatively clean, and thus a modicum of filtering may be applied. Additionally or alternatively the waveform may be "qualified" to disable the operation of the tangent detection except in the vicinity of the knee point, for example by disabling the peak detector until a point close to the knee point is reached. This may be implemented, for example, by modelling the flux in the transformer by integrating the voltage on a primary or auxiliary winding of the transformer, more particularly by integrating the sensing signal, from a point of known zero transformer flux to determine a next point of zero transformer flux. This latter point corresponds to the knee on the primary or auxiliary winding sensing signal and hence the timing of this point may be used to define a window within which the tangent method should look at the sensing signal waveform, for example by enabling the peak detector over this time window. Points of known zero-transformer flux correspond to peaks and troughs on the oscillatory portion of the sensing signal waveform and thus, for example, the integrator may be reset at each of these peaks and troughs so that it is always reset at a point of known zero flux before the power switching device is switched on and the switching cycle begins. The peaks and troughs may conveniently be detected using a peak detector, which may take the form of, for example, a differentiator circuit or a diode capacitor circuit. Preferably the circuit which defines a time window, for example, the aforementioned integrator together with a comparator to determine when the integrator once again reaches its reset value, is arranged so that the window is "opened" just before when the knee point is expected. This can be arranged, for example, by comparing the output of the integrator to its reset value, say zero, modified by a small offset.

We now describe techniques which facilitate a significant improvement in output voltage regulation, in embodiments from +/−5% accuracy to +/−2%, as well as reducing the silicon area budget.

We will thus describe an alternative to the linear decaying peak detector of FIG. 4. Viewed from one perspective this may be considered as a non-linear implementation of a decaying peak detector akin to that of FIG. 4, albeit it lacks switches S1 and S2 and is thus not strictly a decaying peak detector.

Figure 9:
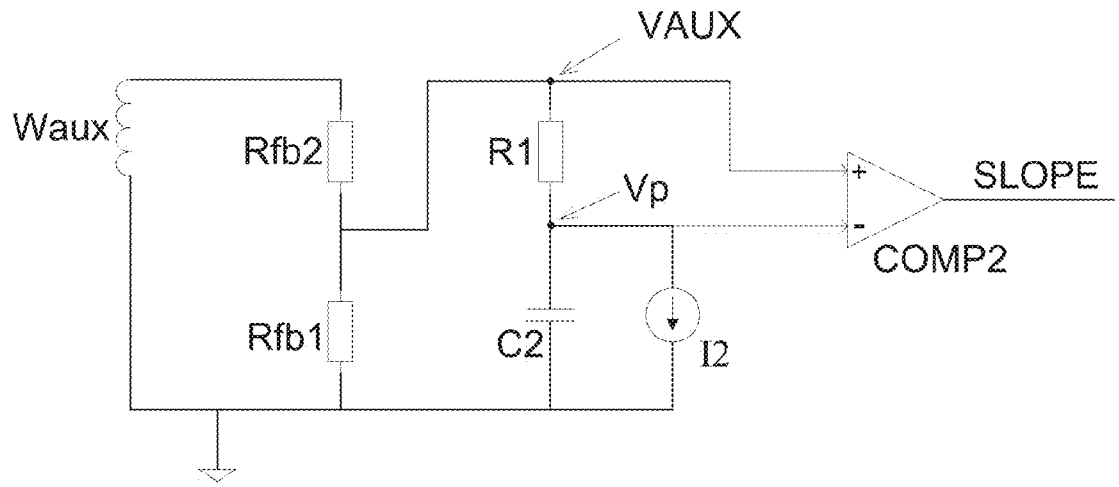
FIG. 9 shows a schematic circuit diagram of a non-linear decaying peak detector for use in an SMPS controller according to an embodiment of the invention.

Thus referring to the schematic circuit diagram of FIG. 9 this circuit allows the knee point to be identified but avoids the use of switches S1 or S2 of the linear decaying peak detector shown in FIG. 4. This is important because such switches introduce noise into the system. However modifications to the circuit, for example in which one or both of switches S1 and S2 are retained, are possible and may provide some of the advantages of the circuit illustrated in FIG. 9.

The operation of the circuit can be described as follows: as before the sensing signal waveform VAUX is acquired from the auxiliary (or other primary side) winding Waux, optionally via a potential divider (Rfb2, Rfb1) and/or other intermediate circuits such as clamps, buffers and the like (not shown). VAUX is applied to the non-inverting input of the comparator. Diode D1 of the linear decaying peak detector in FIG. 4 is replaced by resistor R1. As before capacitor C2 and current source I2 create a decay signal at a node identified by voltage Vp. This decay signal, or tangent, approximates the decaying portion of the sensing signal waveform VAUX. Comparator COMP2 is triggered when the current through resistor R1 is equal to zero. Therefore COMP2 detects when VAUX becomes smaller than Vp and when VAUX becomes larger than Vp. The relative size of VAUX and Vp is therefore indicated by the value of SLOPE, the output of COMP2.

Figure 10:
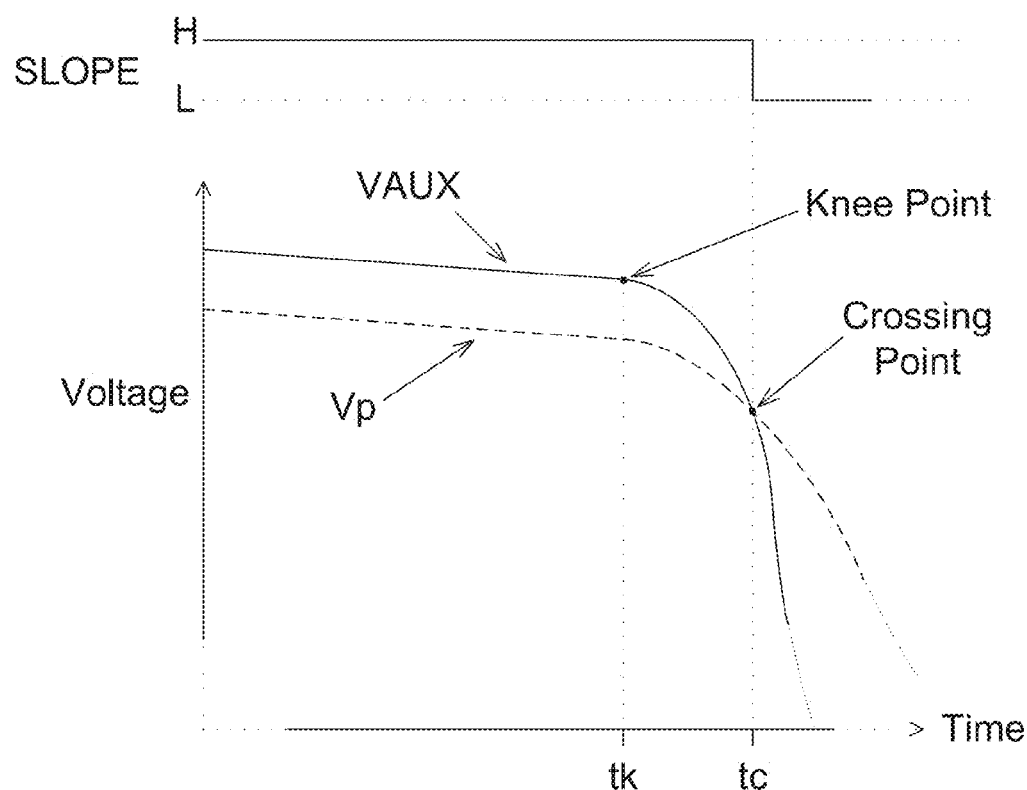
FIG. 10 shows waveforms illustrating the operation of the circuit of FIG. 9.

An important property of this circuit and its analogues is that the rate of change of decay signal Vp is smaller than that of sensing signal VAUX, at least in the vicinity of the knee point. The effect of this is shown in FIG. 10 which shows illustrative circuit waveforms in the immediate vicinity of the knee point on expanded voltage and time scales. (The precise form of the waveforms of FIG. 10 depend on circuit component values).

As previously explained, the knee point lies between the decaying and oscillatory portions of the sensing signal waveform VAUX. Towards the end of the decaying portion VAUX is positive and changes relatively slowly in time, prior to the relatively rapid first decay of the oscillatory portion—see FIG. 7. Resistor R1 ensures that there is a potential difference between sensing signal VAUX and decay signal Vp as the knee point is approached. The sensing signal waveform VAUX begins to decrease rapidly after the knee point and, since it decays faster than decay signal Vp, the two signals become equal at a crossing point shortly after the knee point. This triggers the comparator COMP2, which changes state from High to Low. Beyond the crossing point the sensing signal waveform VAUX decays faster than the threshold set by the decay signal Vp and departs from that signal.

Various parameters can be adjusted to ensure accurate, robust operation of the circuit. For example the rate of the decay signal Vp can be set by choosing appropriate values of resistor R1, capacitor C2 and current source I2. As another example, the potential difference between VAUX and Vp depends in part on the size of resistor R1. A smaller resistance R1 produces a smaller potential difference between sensing signal waveform VAUX and decay signal Vp. This enables an earlier response to the rapid fall of VAUX after the knee point for a given setting of the decay signal Vp, but increases susceptibility to noise in the sensing signal waveform VAUX.

It must be stressed that FIG. 10 focuses on the immediate vicinity of the knee point, and the delay between the knee point and the crossing point is small relative to the total length of the decaying portion of VAUX: For example the difference between tk and tc may be of the order nanoseconds whereas the decaying portion of the sensing signal waveform may have a duration of the order microseconds or tens of microseconds. Nevertheless compensation for this delay may be provided by known techniques, for example through setting of appropriate device offsets such as that of comparator COMP2, and the like.

In FIG. 9 components capacitor C2 and current source I2 are shown as having fixed values. A resistor R2 may be used as current source I2. Furthermore either or both of C2 and I2 (or R2) may be trimmable after semiconductor processing to provide reduced variation over the manufacturing process. This can provide a more consistent determination of the knee point across a wafer of ICs or within, or between, wafer batches.

The preferred decay rate of the decay signal Vp is that which provides the most accurate and robust identification of the knee point. This may be found to be a more negative slope than that of any likely decay of sensing signal waveform VAUX during the decaying portion (except for noise and leakage inductance spike decays). The preferred decay rate will also have a less negative slope than the most rapid decay of the oscillatory portion of the sensing signal waveform, as illustrated in FIG. 7.

The absence of switch S1 and D1 modifies the behaviour of this circuit from that of the linear decaying peak detector of FIG. 4. In particular the decay signal Vp can decay faster than the linear decaying peak detector's tangent when VAUX is smaller than Vp. This is possible because current can now flow through resistor R1 to the auxiliary winding Waux as well as from it. Nonetheless this circuit still retains characteristics of a decaying peak detector, albeit one that has a decay rate that varies with the amplitude of the input signal. One advantage of this variable decay rate is that the knee point detector recovers faster from large voltage transients, such as that resulting from a leakage inductance spike near the beginning of the decaying portion of the sensing signal waveform. At high power supply loads this spike can be large enough that the linear decaying peak detector does not decay to the level of VAUX in time to detect the knee point.

Due to noise and ringing components in the sensing signal waveform VAUX there may be more than one crossing point during its decaying portion. If all crossing points of the sensing signal waveform VAUX and decay signal Vp during the decaying portion are detected, then the true knee point may be identified as the last instance of VAUX decaying below the value of Vp prior to the feedback signal falling to zero. This is a direct analogue to 'last departure' detection as discussed in the context of the linear decaying peak detector.

It will be appreciated that the rate of change of the decay signal Vp in the vicinity of the knee point depends, inter alia, on the instantaneous value of Vp. For example a higher value of Vp may lead to a higher rate of change of decay signal Vp. A consequence of this is that the threshold decay rate of the sensing signal waveform VAUX is lower at lower values of VAUX. This means that when the SMPS output voltage is lower, such as under high load conditions, the threshold decay rate is also lower. This allows for effective signal compression at lower output voltages, and has benefits in current regulation techniques that make use of knee point identification.

Embodiments of the circuit of FIG. 9 use a decay signal of slower decay than a sensing signal to detect the knee point in the sensing signal. Embodiments also provide a decaying peak detector with variable decay rate dependent on input signal amplitude. Embodiments provide efficient use of silicon area and higher accuracy than other primary side sensing methods.

Broadly, we have described a method and system for identifying the knee point by fitting a tangent to a portion of the power transformer voltage waveform, and sampling the VAUX at the knee point to determine the SMPS output voltage. In preferred embodiments this technique is implemented using a decaying peak detector, providing a timing signal indicating detection of the knee point. Sample/hold and error amplifier circuits may be employed to achieve output voltage regulation.

The techniques we have described provide a low cost method of accurately estimating the output voltage of a switched-mode power supply which achieves better output regulation, reduced audio noise and lower implementation cost than other primary-side sensing techniques.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A system for sensing an output voltage of a switch mode power supply (SMPS), the SMPS including a switched magnetic energy storage device for conveying power from a SMPS input to a SMPS output of said SMPS, said magnetic device having at least one winding, the system comprising;
    a sensing signal input to receive a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output;
    a signal follower coupled to said sensing signal input to generate a decay signal approximating said decaying portion of said sensing signal waveform;
    a comparator to compare said decay signal with said sensing signal waveform to identify substantially a knee point on said sensing signal waveform when said sensing signal waveform decays faster than said decay signal; and
    a sampler to sample said sensing signal responsive to said comparator to provide an output signal sensing said output voltage of said SMPS,
    wherein said coupling of said signal follower to said sensing signal input is such that decay of said decay signal is dependent on said sensing signal waveform.

2. A system for sensing as claimed in claim 1, wherein said comparator is arranged detect a point of crossing of said sensing signal waveform and said decay signal to identify substantially when said sensing signal waveform decays faster than said decay signal.

3. A system for sensing as claimed in claim 2, configured to detect a last said crossing point by said comparator prior to said sensing signal waveform falling to substantially zero.

4. A system for sensing as claimed in claim 1, wherein said comparator is arranged to detect a point when a negative slope in said sensing signal waveform is greater than a threshold negative slope.

5. A system for sensing as claimed in claim 4, wherein said comparator is configured to detect a last said point prior to said sensing signal waveform falling to substantially zero.

6. A system for sensing as claimed in claim 4 wherein said threshold negative slope is set by one or more trimmable components.

7. A system for sensing as claimed in claim 1, wherein said comparator is arranged to detect a point when said sensing signal waveform departs from said decay signal, to identify substantially when said sensing signal waveform decays faster than said decay signal.

8. A system for sensing as claimed in claim 7, configured to detect a last said point detection by said comparator prior to said sensing signal waveform falling to substantially zero.

9. A system for sensing as claimed in claim 1, wherein said signal follower is coupled to said sensing signal input by circuitry, said circuitry comprising at least one circuit component, wherein said circuitry is connected to conduct charge from said signal follower toward said sensing signal input and to conduct charge from said sensing signal input toward said signal follower.

10. A system for sensing as claimed in claim 9, wherein said at least one circuit component is configured to provide potential difference between input terminals of said comparator during said first, decaying portion of said sensing signal waveform, said potential difference determined by difference between said sensing signal waveform and said decay signal.

11. A system for sensing as claimed in claim 10, wherein said at least one circuit component comprises a resistor to provide said potential difference.

12. A system for sensing as claimed in claim 10, wherein said comparator is configured such that an output of said comparator changes state when said potential difference becomes equal to a threshold, falls below a threshold or rises above a threshold, to identify substantially when said sensing signal waveform decays faster than said simultaneous decay of said decay signal.

13. A system for sensing as claimed in claim 12, wherein said threshold is substantially zero.

14. A system for sensing as claimed in claim 9, wherein said signal follower comprises a capacitor to hold said charge conducted by said at least one circuit component toward said signal follower to provide said decay signal.

15. A system for sensing as claimed in claim 14, wherein said signal follower comprises a substantially constant current generator to discharge said capacitor to at least contribute to said decay of said decay signal.

16. A system for sensing as claimed in claim 15, wherein said substantially constant current generator comprises a resistor.

17. A system for sensing as claimed in claim 16, wherein said resistor is trimmable.

18. A system as claimed in claim 1 wherein said magnetic device has at least two windings, including an auxiliary winding, and wherein said sensing signal is from said auxiliary winding.

19. An SMPS controller including the sensing system of claim 1 and a comparator to compare said output signal with a reference to provide a control output for controlling an SMPS responsive to said comparison.

20. An SMPS including an SMPS controller as claimed in claim 19.

21. A system for sensing an output voltage of a switch mode power supply (SMPS), the SMPS including a switched magnetic energy storage device for conveying power from a SMPS input to a SMPS output of said SMPS, said magnetic device having at least one winding, the system comprising;
    a sensing signal input to receive a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output;
    a signal following circuit component having a first connection coupled to said sensing signal input, and having a second connection;
    a comparator having first and second inputs respectively coupled to said first and second connections of said signal following circuit component to identify substantially a knee point on said sensing signal waveform;
    a decay circuit coupled to said second connection of said signal following circuit component; and
    a sampler to sample said sensing signal responsive to an output of said comparator to provide an output signal sensing said output voltage of said SMPS.

22. A system as claimed in claim 21 wherein said signal following circuit component comprises a resistor.

23. A system as claimed in claim 22 wherein said decay circuit comprises a capacitor coupled in parallel with a substantially constant current generator.

24. A system as claimed in claim 23 wherein said substantially constant current generator comprises a resistor coupled in parallel with said capacitor.

25. A system as claimed in claim 24 wherein said resistor is a trimmable resistor.

26. A system as claimed in claim 21 wherein said magnetic device has primary, secondary and auxiliary windings, further comprising a potential divider coupled between said auxiliary winding and said sensing signal input receiving said sensing signals.

27. A system as claimed in claim 21 wherein said comparator detects when a current through said signal following circuit component is substantially zero.

28. A method of sensing an output voltage of a switch mode power supply (SMPS), the SMPS including a switched magnetic energy storage device for conveying power from an input to an output of said SMPS, said magnetic device having at least one winding, the method comprising:
    inputting on an input line a sensing signal from said at least one winding of said magnetic device, said sensing signal having a waveform with a first, decaying portion during which power is supplied by said magnetic device to said SMPS output and a second portion during which substantially no power is supplied by said magnetic device to said SMPS output;
    identifying substantially a knee point on said sensing signal waveform between said decaying portion and said second portion of said waveform; and
    using a value of said sensing signal at said substantial knee point to sense said SMPS output voltage; and
    wherein said identifying of said substantial knee point comprises generating on a decay signal line a decay signal approximating said decaying portion of said sensing signal waveform; and
    identifying crossing of said sensing signal waveform and said decay signal to identify said substantial knee point,
    wherein said generating generates said decay signal such that decay of said decay signal is dependent on said decaying portion of sensing signal waveform.

29. The method according to claim 28, comprising sampling said sensing signal responsive to said crossing identification to provide an output signal sensing said output voltage of said SMPS.

30. The method according to claim 28, comprising conducting of charge from said decay signal line toward said input line by at least one circuit component.

31. The method according to claim 30, comprising selecting a value of a said circuit component to set a rate of decay of said decay signal during said first, decaying portion and said second portion of said sensing signal.

32. The method according to claim 30, comprising selecting a value of a said circuit component to determine a delay between a start of said second portion and said crossing.

33. The method according to claim 28, wherein said generating of a decay signal comprises charging and discharging a capacitor.

34. The method according to claim 33, comprising selecting a value of said capacitor to set a rate of decay of said decay signal during one or both of said first, decaying portion and said second portion of said sensing signal.

35. The method according to claim 33, wherein said discharging of said capacitor is performed by a current sink conducting charge from said capacitor towards a reference voltage.

* * * * *